H. B. KEIPER.
CREAM SEPARATOR.
APPLICATION FILED MAY 12, 1917.
1,241,988.
Patented Oct. 2, 1917.
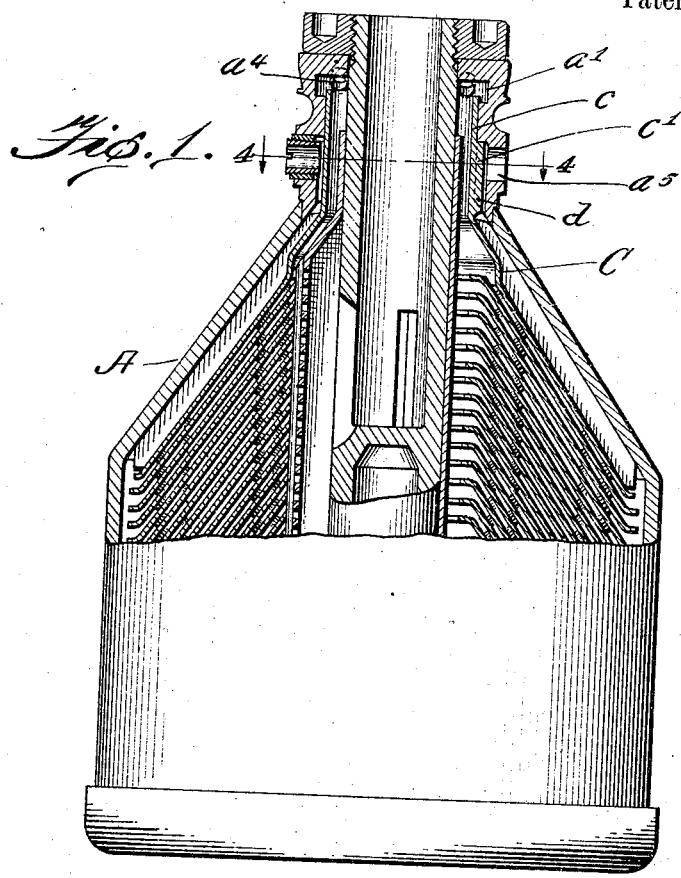
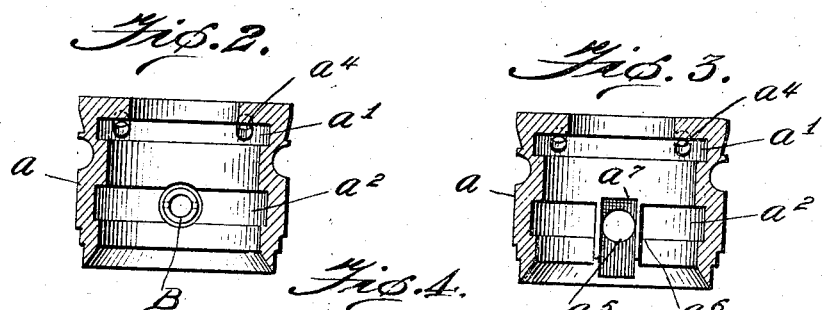

UNITED STATES PATENT OFFICE.

HENRY B. KEIPER, OF LANCASTER, PENNSYLVANIA.

CREAM-SEPARATOR.

1,241,988.    Specification of Letters Patent.    Patented Oct. 2, 1917.

Application filed May 12, 1917. Serial No. 168,185.

*To all whom it may concern:*

Be it known that I, HENRY B. KEIPER, a citizen of the United States, residing at Lancaster, in the county of Lancaster and State of Pennsylvania, have invented certain new and useful Improvements in Cream-Separators; and I do hereby declare the following to be a full, clear, and exact description of the invention, such as will enable others skilled in the art to which it appertains to make and use the name.

This invention relates to centrifugal liquid separators, and more particularly to centrifugal machines especially designed and adapted to separate cream from milk and which are known in the art as "cream separators".

The primary object of my invention is to provide simple and efficient means for regulating the relative proportions of milk and cream so that the percentage of cream may be varied at will, and the separation effected in such manner that the cream discharge may be gradually lessened while the quantity of milk is gradually increased, or vice versa, thereby enabling the user to obtain either a very light or thin cream and comparatively little skimmed milk, or a very thick or heavy cream and more skimmed milk, or to separate the milk and cream in whatever proportions the user may desire, and to maintain a uniform admixture of milk and cream when a thick or heavy cream is not desired.

The invention consists essentially in improved means for regulating the relative proportions of the separated liquid or milk and cream, including a regulating screw or equivalent device located at the upper end of the separator bowl and having a milk exit or passage therethrough in communication with the space from which the skimmed milk is discharged, whereby the percentage of milk and cream may be varied to such an extent that either very heavy or very light cream may be obtained, or any desired quality or admixture between the two extremes, by simply adjusting the screw or regulating device controlling the milk exit.

The invention will first be hereinafter more particularly described, with reference to the accompanying drawings, which form a part of this specification, and then pointed out in the claims at the end of the description.

In said drawings, Figure 1 represents a vertical section, partly in side elevation, of a cream separator bowl and parts contained therein, illustrating the interior construction and arrangement of the milk inlet and distributing and separating devices of a preferred form of cream separator with my improved regulating device applied thereto;

Fig. 2 is a vertical section of the neck of the bowl detached;

Fig. 3 is a vertical section of said neck taken at right angles to the section shown in Fig. 2; and Fig. 4 is a transverse section taken on the line 4—4 of Fig. 1.

Referring to said drawings, in which the same reference letters are used to denote corresponding parts in different views, the letter A may denote the separator bowl of an ordinary cream separator having a neck extension $a$ with milk and cream exits therein and housing within the bowl a milk inlet tube and milk distributing and separating device of the form shown or of any suitable construction, but preferably of the same general construction as those shown in U. S. Patents Nos. 1,168,452 and 1,168,454, dated January 18, 1916, and adapted to operate in the same manner; but such devices form no part of my present invention, which resides in the means employed for regulating the relative proportions of milk and cream, and therefore further description of the milk distributing and separating devices is deemed unnecessary.

The neck $a$ of the bowl may be formed as an integral part thereof, but it is preferably constructed separately, having its lower end shaped to fit snugly in an opening in the top of the bowl, as shown, and secured thereto by soldering or otherwise so as to form practically an integral structure. On the interior of the neck $a$ are formed or provided spaced annular grooves or channels $a^1$, and $a^2$, the channel $a^2$ being preferably wider and of greater capacity than the channel $a^1$ to adapt it to conduct the larger volume of skimmed milk to and out of a lateral opening in the neck of the bowl in which is adjustably fitted a tubular plug or nipple B through which the milk is discharged; said plug being preferably exteriorly threaded and screwed into an interiorly threaded opening or bushing within an opening formed in the neck of the bowl, as shown in Figs. 1 and 4. Cream exits or openings $a^4$ are also provided above the milk exit in communication with the smaller groove or channel $a^1$, through which the cream is discharged in greater or less quantity as desired in skimming the milk so as to obtain thin or thick cream by adjusting the regulating device. The uppermost conical disk C has a tubular extension or neck $c$ which extends up into and fits snugly within the neck of the bowl, so as to separate the milk and cream exits, and is formed or provided, on the outer side thereof, preferably at a point diametrically opposite the milk exit B, with a boss or protuberance $c^1$, which faces and partially closes an aperture $a^5$ in the neck of the bowl, being fitted closely between vertical ribs or flanges $a^6$ on the interior of the bowl neck which cut off communication between the skimmed milk passage $a^2$ and the milk exit $a^5$, on either side of the latter, and serve as guides for the boss $c^1$ and to insure the assembling of the two parts at all times in the same relative positions, and also prevents rotation of one part independently of the other. The protuberance or boss $c^1$ is preferably of oblong form and has a smooth face confronting a smooth surface between the ribs $a^6$ on the interior of the bowl neck and spaced therefrom a hair's breadth or thereabout so as to provide an air vent to relieve the pressure due to an accumulation of air in the neck of the bowl and maintain a uniform pressure therein, whereby the separation of the liquids is facilitated and uniformity in the product or component parts of the separated liquids assured.

A single cream exit may suffice for the purpose of separating the cream and skimmed milk in certain proportions determined by the capacity of the exit, but in order to effect a separation in different proportions varying from a thick or heavy cream and a comparatively large volume of skimmed milk to a very light or thin cream and a comparatively small volume of skimmed milk, as contemplated by my invention, a plurality of cream exits are desirable, in this instance four being employed, thus providing for the unrestricted outflow through the cream exits in any desired relative proportions without retarding the outflow or limiting the amount of cream by an orifice of less capacity than the milk outlet. The smallest possible quantity of cream may be obtained by moving the adjusting screw to its outmost position and by moving this screw gradually inwardly the quantity of cream may be gradually increased until it equals or even exceeds the quantity of skimmed milk, and the air vent compensates for any variation of pressure within the bowl neck around and about the milk and cream exits and insures the maintenance of a uniform pressure under all ordinary conditions.

It will be understood of course that changes may be made in the details of construction and arrangement of parts without departing from the spirit and scope of my invention, and I therefore do not desire to be limited to the specific construction shown and described.

Having thus described my invention, what I claim as new and desire to secure by Letters Patent of the United States is:

1. In a centrifugal cream separator, a separator bowl containing milk inlet and distributing and separating devices, including a member having a neck secured within the neck of the bowl, and milk and cream passages in the bowl neck separated by the neck of said member, a cream exit leading from said cream passage, and an adjustable tubular milk outlet in communication with said milk passage and an air-vent associated therewith for relieving the pressure within the bowl neck and maintaining a uniform pressure therein.

2. In combination with a cream separator bowl having separate passages for the outgoing milk and cream, and outlets therefrom, means for regulating the relative proportions of milk and cream, discharged through said outlets and maintaining a uniform pressure of the liquids and air confined within the bowl around and about said outlets; said means comprising an adjustable tubular milk outlet and an air-vent in communication with said milk passage.

3. In combination, a separator bowl having a conical portion provided with a tubular neck, a separating member within the bowl having a tubular neck fitting snugly within the bowl neck and separating spaced milk and cream passages, each provided with an outlet, and an air vent in communication with the passage leading to said milk outlet, whereby a uniform pressure is maintained within the bowl.

4. In combination, a separator bowl having a conical portion provided with a tubular neck, a separating member within the bowl having a tubular neck fitting snugly within the bowl neck and separating spaced milk and cream outlets therein, and an air vent in communication with a passage leading to one of said outlets, whereby a uniform pressure is maintained within the bowl, together with a tubular plug controlling the outlet from one of said passages and adjustable to regulate the relative proportions of the separated liquids.

5. In a centrifugal cream separator, a bowl having a neck extension provided with spaced internal annular grooves or channels forming passages for milk and cream in communication with the interior of the bowl and openings through said neck in communication with said passages to provide milk and cream outlets, a tubular plug adjustably secured in said milk outlet for regulating the relative proportions of skimmed milk and cream, and an air port in said neck communicating with the milk passage.

6. In a centrifugal cream separator, a bowl having a neck extension provided with a plurality of internal annular grooves or channels and openings through said neck in communication with said channels, to provide milk and cream outlets, a tubular plug adjustably secured in said milk outlet for regulating the relative proportions of milk and cream, and an air port in communication with the channel leading to said milk outlet.

7. In a centrifugal cream separator, a bowl having a neck extension provided with a plurality of cream exits at or near the top thereof, a milk exit below said cream exit, means for separating the milk and cream exits, a tubular plug adjustably secured in said milk exit for regulating the relative proportions of milk and cream, and an air port in communication with the passage leading to the outlet for skimmed milk.

8. In a centrifugal cream separator, a bowl having a tubular neck internally grooved to provide milk and cream passages; said neck being provided with one or more outlets from each of said passages, a cream dome having a tubular neck closely fitting the interior of the neck of the bowl and separating said milk and cream passages; said milk outlet having a tubular plug adjustably secured therein, and an air port in communication with the milk passage.

9. In combination, a bowl having a tubular neck, a milk inlet tube within said bowl having discharge openings therein, a milk distributing device surrounding said tube, a series of superposed conical plates or disks fitted upon and surrounding said milk distributing device, the uppermost disk having a tubular neck extension closely fitting within the neck of the bowl and provided with radially extending ribs, the bowl neck having a milk outlet and a tubular plug fitted therein and a cream outlet above said milk outlet and separated therefrom together with an air port in communication with the passage leading to said milk outlet.

In testimony whereof I affix my signature in the presence of two witnesses.

HENRY B. KEIPER.

Witnesses:
C. B. LONG,
GEO. HAMMOND.

Copies of this patent may be obtained for five cents each, by addressing the "Commissioner of Patents, Washington, D. C."